(12) United States Patent
Yang et al.

(10) Patent No.: US 12,111,910 B2
(45) Date of Patent: Oct. 8, 2024

(54) PORT MANAGEMENT METHOD, SYSTEM AND DEVICE, AND COMPUTER READABLE STORAGE MEDIUM

(71) Applicant: IEIT SYSTEMS CO., LTD., Shandong (CN)

(72) Inventors: Chuan Yang, Shandong (CN); Haili Zhao, Shandong (CN); Rongrong Ju, Shandong (CN)

(73) Assignee: IEIT SYSTEMS CO., LTD., Shandong (CN)

( * ) Notice: Subject to any disclaimer, the term of this patent is extended or adjusted under 35 U.S.C. 154(b) by 0 days.

(21) Appl. No.: 18/696,398

(22) PCT Filed: Dec. 23, 2022

(86) PCT No.: PCT/CN2022/141659
§ 371 (c)(1),
(2) Date: Mar. 28, 2024

(87) PCT Pub. No.: WO2023/155597
PCT Pub. Date: Aug. 24, 2023

(65) Prior Publication Data
US 2024/0265090 A1    Aug. 8, 2024

(30) Foreign Application Priority Data
Feb. 17, 2022  (CN) .......................... 202210144149.1

(51) Int. Cl.
G06F 21/45     (2013.01)
G06F 9/4401    (2018.01)
G06F 21/44     (2013.01)

(52) U.S. Cl.
CPC ............ *G06F 21/44* (2013.01); *G06F 9/4411* (2013.01); *G06F 21/45* (2013.01)

(58) Field of Classification Search
None
See application file for complete search history.

(56) References Cited

U.S. PATENT DOCUMENTS

2009/0049213 A1*  2/2009  Chen .................... G06F 13/385
                                                          710/104
2013/0031541 A1   1/2013  Wilks et al.
(Continued)

FOREIGN PATENT DOCUMENTS

CN        1584822 A       2/2005
CN      101281572 A      10/2008
(Continued)

OTHER PUBLICATIONS

Ruirui Wu et al. "Implementation of general acquisition interface in accordance with SMBIOS specification." China New Technology and New Products, vol. 2010, No. 5. Mar. 10, 2010.
(Continued)

*Primary Examiner* — Nelson S. Giddins
(74) *Attorney, Agent, or Firm* — IPro, PLLC (57) ABSTRACT

Provided are a port management method, system and device, and a computer readable storage medium. The method includes: writing, via a basic input output system (BIOS), permissions corresponding to the N USB ports into a system management basic input output system (SMBIOS); in response to a USB port being inserted with a USB device, querying, in the SMBIOS, the permission corresponding to the USB port inserted with the USB device; and setting driving parameters of the USB device according to the permission corresponding to the USB port inserted with the USB device.

14 Claims, 2 Drawing Sheets

(56) References Cited

U.S. PATENT DOCUMENTS

| | | |
|---|---|---|
| 2014/0337558 A1 | 11/2014 | Powers et al. |
| 2015/0186161 A1 | 7/2015 | Cho |
| 2022/0276687 A1* | 9/2022 | Truong ................. G06F 1/3296 |

FOREIGN PATENT DOCUMENTS

| | | |
|---|---|---|
| CN | 105955857 A | 9/2016 |
| CN | 106021043 A | 10/2016 |
| CN | 107479931 A | 12/2017 |
| CN | 107506217 A | 12/2017 |
| CN | 110188528 A | 8/2019 |
| CN | 110245527 A | 9/2019 |
| CN | 112506820 A | 3/2021 |
| CN | 114186217 A | 3/2022 |
| TW | 200745948 A | 12/2007 |

OTHER PUBLICATIONS

Juntao Zhang et al. "Angr-Based Detection Method Against Malicious Code Sandbox." Computer Applications and Software, vol. 36, No. 2. Feb. 28, 2019.

Reddy, Surya Teja, et al. "USB_SEC: A secure application to manage removable media." 2016 10th International Conference on Intelligent Systems and Control (ISCO). IEEE, 2016.

* cited by examiner

PORT MANAGEMENT METHOD, SYSTEM AND DEVICE, AND COMPUTER READABLE STORAGE MEDIUM

CROSS-REFERENCE TO RELATED APPLICATION

The disclosure claims priority to Chinese patent application No. 202210144149.1, entitled "PORT MANAGEMENT METHOD, SYSTEM AND DEVICE, AND COMPUTER READABLE STORAGE MEDIUM", filed on Feb. 17, 2022 before the China National Intellectual Property Administration, which is incorporated herein in its entirety by reference.

TECHNICAL FIELD

The disclosure relates to the field of port management, in particular to a port management method, a port management system, a port management device and a computer readable storage medium.

BACKGROUND

With the advent of the big data era, data security is increasingly valued by people. The universal serial bus (USB) port is widely used as a data transmission interface, and the impact of permissions of the USB port on data security is beyond doubt. For example, the permissions of the USB port are managed, so that the USB port can only recognize the keyboard and mouse, and cannot recognize USB storage devices, or the computer is restricted so that it can only read data from USB storage devices connected to the USB port and cannot write data to USB storage devices connected to the USB port. In the related art, when the USB port is managed, a third party software runs under an operating system (OS) to manage the permissions of the USB port. However, once the third party software is maliciously uninstalled, the management of the USB port cannot be performed, and the security and stability are low. Alternatively, a USB port permission control chip is installed at a USB controller corresponding to the USB port. However, because additional hardware is required, the hardware cost may be increased.

SUMMARY

It is an object of the disclosure to provide a port management method, a port management system, a port management device and a computer readable storage medium.

Some embodiments of the present disclosure provide a port management method, applied to a computer including N universal serial bus (USB) ports, N being an integer not less than 2, the port management method includes:
  writing, via a basic input output system (BIOS), permissions corresponding to the N USB ports into a system management basic input output system (SMBIOS);
  in response to a USB port being inserted with a USB device, querying, in the SMBIOS, the permission corresponding to the USB port inserted with the USB device; and
  setting driving parameters of the USB device according to the permission corresponding to the USB port inserted with the USB device.

In some embodiments, the writing, via the BIOS, permissions corresponding to the N USB ports into the SMBIOS includes:
  determining, via the BIOS, the N USB ports and the permissions corresponding to the N USB ports, creating Types that are in one-to-one correspondence with the N USB ports in the SMBIOS, and writing the permissions corresponding to the N USB ports into the Types corresponding to respective USB ports.

In some embodiments, the determining the permissions corresponding to the N USB ports includes:
  querying and recording the permissions corresponding to the N USB ports set by the user on a USB port interface under BIOS.

In some embodiments, the recording the permissions corresponding to the N USB ports set by the user on the USB port interface under BIOS includes:
  recording the permissions of respective USB ports via a variable USB_X_STATUS_Y;
  a value of X in the variable USB_X_STATUS_Y represents an universal serial bus port identify label USB-Port ID of a USB port, and a value of Y in the variable USB_X_STATUS_Y corresponds to the permission of the USB port set by the user.

In some embodiments, the writing the permissions corresponding to the N USB ports into the Types corresponding to respective USB ports includes:
  determining a Type corresponding to the USB port in the SMBIOS according to the X value of the USB port, and writing the permission of the USB port into the Type corresponding to the USB port according to the Y value of the USB port.

In some embodiments, the determining the N USB ports includes:
  acquiring device paths of the N USB ports from a peripheral component interconnect (PCI) configuration space of USB controllers that are in one-to-one correspondence with the N USB ports; and
  determining the N USB ports according to the device paths.

In some embodiments, the acquiring device paths of the N USB ports from the PCI configuration space of USB controllers that are in one-to-one correspondence with the N USB ports includes:
  reading a PCI BUS, a PCI device, a PCI function and a PCI segment in the PCI configuration space of the USB controllers that are in one-to-one correspondence with the N USB ports; and
  obtaining the device paths of the N USB ports from the read PCI BUS, PCI device, PCI function and PCI segment.

In some embodiments, after acquiring device paths of the N USB ports from the PCI configuration space of USB controllers that are in one-to-one correspondence with the N USB ports, the port management method further includes:
  recording the device paths into the corresponding Types.

In some embodiments, the writing the permissions corresponding to the N USB ports into the Types corresponding to respective USB ports includes:
  creating a preset field in the Type, and writing permissions corresponding to the N USB ports into the preset fields in the Types corresponding to the respective USB ports; and
  the querying, in the SMBIOS, the permission corresponding to the USB port inserted with the USB device includes:
  querying, in the preset field of the Type corresponding to the USB port inserted with the USB device in the SMBIOS, the permission corresponding to the USB port inserted with the USB device.

In some embodiments, the querying, in the preset field of the Type corresponding to the USB port inserted with the USB device in the SMBIOS, the permission corresponding to the USB port inserted with the USB device includes:

determining the Type corresponding to the USB port inserted with the USB device; and querying, in the preset field in the corresponding Type, the permission corresponding to the USB port inserted with the USB device.

In some embodiments, the preset field is a SupportProperty field, and the writing the permissions corresponding to the N USB ports into the Types corresponding to respective USB ports includes:

creating SupportProperty fields in the Types corresponding to the N USB ports; and writing permissions corresponding to the N USB ports into the SupportProperty fields in the Types corresponding to the respective USB ports.

In some embodiments, the querying, in the preset field in the corresponding Type, the permission corresponding to the USB port inserted with the USB device includes:

querying, in the SupportProperty field in the Type corresponding to the USB port inserted with the USB device, the permission corresponding to the USB port inserted with the USB device.

In some embodiments, the writing, via the BIOS, permissions corresponding to the N USB ports into the SMBIOS includes:

writing, via the BIOS, the permissions corresponding to the N USB ports into the SMBIOS when the computer is powered on.

In some embodiments, the querying, in the SMBIOS, the permission corresponding to the USB port inserted with the USB device includes:

querying, in the SMBIOS, the permission corresponding to the USB port inserted with the USB device under an operating system (OS).

In some embodiments, the setting driving parameters of the USB device according to the permission corresponding to the USB port inserted with the USB device includes:

setting, according to the permission corresponding to the USB port inserted with the USB device, the driving parameters of the USB device under an operating system (OS).

In some embodiments, the port management method further includes:

in response to the USB device being inserted, recording a device provider identity document (ID) and a device product identity document (ID) of the inserted USB device.

In some embodiments, the permissions corresponding to the N USB ports includes:

a combination of one or more of: a first permission that only allows the USB port to identify a keyboard and a mouse, and does not allow the the USB port to identify a USB storage device; a second permission that only allows to read data in the USB device connected to the USB port, and does not allow to write data into the USB device connected to the USB port; a third permission that allows to read data in the USB device connected to the USB port and write data into the USB device connected to the USB port; and a fourth permission for disabling the USB device connected to the USB port.

Some embodiments of the present disclosure provide a port management system including:

a USB port permission writing unit configured for writing, via a BIOS, permissions corresponding to N USB ports into an SMBIOS;

a USB port permission querying unit configured for, in response to a USB port being inserted with a USB device, querying, in the SMBIOS, the permission corresponding to the USB port inserted with the USB device; and a USB device driving parameter setting unit configured for setting, according to the permission corresponding to the USB port inserted with the USB device, driving parameters of the USB device.

Some embodiments of the present disclosure provide a port management device, including:

a memory configured for storing a computer program; and a processor configured for executing the computer program to implement steps of the port management method described above.

Some embodiments of the present disclosure further provide a non-volatile computer readable storage medium, the non-volatile computer readable storage medium is stored with a computer program that, when executed by a processor, implements steps of the port management method described above.

BRIEF DESCRIPTION OF THE DRAWINGS

In order to explain the technical solutions in some embodiments of the disclosure more clearly, the drawings required to be used in the related art or embodiments will be briefly introduced below. It should be apparent that the drawings in the following description are some embodiments of the disclosure. Other drawings may be obtained by those skilled in the art based on these drawings without paying any creative effort.

DETAILED DESCRIPTION OF THE EMBODIMENTS

Some embodiments of the disclosure provide a port management method, a system, a device and a computer readable storage medium. Compared with the related art, in which the third party software is used to manage permissions of the USB port under an operating system (OS), the security of the port management method of the present disclosure is better, and the situation that the USB port cannot be managed due to the third party software being uninstalled is avoided, and the stability and security of the USB port management are improved.

In order that the objects, aspects, and advantages of some embodiments of the disclosure will become more apparent, the technical solutions of some embodiments of the disclosure will now be described more clearly and thoroughfully with reference to the accompanying drawings. It is to be understood that merely a part of embodiments rather than all embodiments are described. Based on the embodiments of the disclosure, all other embodiments obtained by those skilled in the art without paying creative effort fall within the scope of protection of the disclosure.

Figure 1:
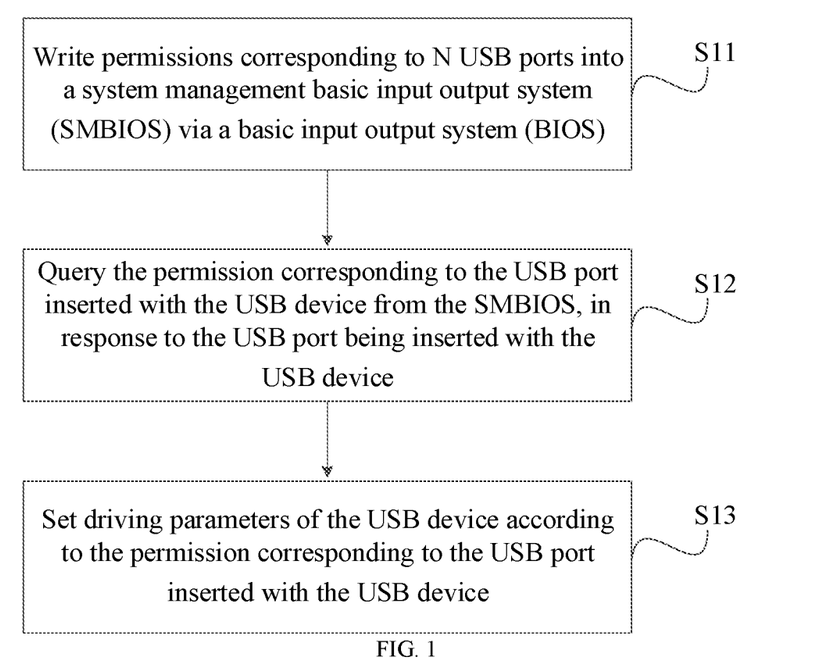
FIG. 1 is a flow chart of a port management method provided in some embodiments of the disclosure.

With reference to FIG. 1, FIG. 1 is a flow chart of a port management method provided in some embodiments of the disclosure.

The port management method is applied to a computer including N USB ports, and N is an integer not less than 2. The port management method includes steps described below.

At S11, permissions corresponding to the N USB ports are written into a system management basic input output system (SMBIOS) via a basic input output system (BIOS).

The BIOS is a set of programs that are solidified to a chip on a computer motherboard, and stores the most important basic input and output programs of the computer, system setting information, Power On Self Test program and system self-starting program, etc. The SMBIOS is a unified specification followed by motherboard or system manufacturers to display product management information in a standard format. Currently, all the computers on the market support the SMBIOS2.3 standard, and for machines that support the SMBIOS standard, relevant information about the computer may be obtained by accessing to SMBIOS. The information in the SMBIOS is written by the computer through the BIOS. In the existing technology, the BIOS does not write the permission of the USB port into the SMBIOS. In the existing technology, when the third party software, through which the permission of the USB port is managed under the OS, is maliciously uninstalled, management of the USB port cannot be performed, leading to poor security and stability. In order to solve the above-mentioned problem, in the present embodiment, when a computer is powered on, the permissions corresponding to the N USB ports are written into the SMBIOS via the BIOS, that is to say, the permission settings of the N USB ports are saved in a bottom layer of the system, ensuring the stability of the USB permission settings.

At S12, when a USB port is inserted with a USB device, the permission corresponding to the USB port inserted with the USB device is queried from the SMBIOS.

When there is a USB port inserted with a USB device among the N USB ports of the computer, in order to set the permission corresponding to the USB port inserted with the USB device under the OS, it is necessary to query, under the OS, the permission corresponding to the USB port that is written through the BIOS and saved in the SMBISO, so that the USB devices inserted into the USB port communicate with the computer according to this permission.

At S13, driving parameters of the USB device are set according to the permission corresponding to the USB port inserted with the USB device.

Once the USB device is inserted into the USB port, the OS will automatically load the drive program of the USB device, and the permission of the USB device inserted into the USB port is determined by the drive program of the USB device. Accordingly, in order to keep the permission of the USB device inserted into the USB port consistent with the permission of the USB port written in the SMBIOS, in the present embodiment, the OS will set the driving parameters of the USB device according to the permission corresponding to the USB port inserted with the USB device written in the SMBIOS.

In summary, in the present embodiment, permissions corresponding to the N USB ports are written into the SMBIOS via the BIOS, and when a USB port is inserted with a USB device under an OS, the permission corresponding to the USB port inserted with the USB device is queried from the SMBIOS via the OS, and the driving parameters of the USB device are set according to the permission corresponding to the USB port inserted with the USB device. Since the permissions of the USB ports are all written into the SMBIOS via the BIOS, the setting of the permissions of the USB ports is realized on a bottom layer, compared with managing the permissions of the USB ports by using the third party software under the OS in the existing technology, the security is higher, there is no possibility of being incapable of managing the USB ports due to the third party software being uninstalled. Therefore, the stability and security of the management of the USB ports are improved without providing additional hardware, and the costs are saved.

On the basis of embodiments described above, in some embodiments, the step in which the permissions corresponding to the N USB ports are written into the SMBIOS via the BIOS includes:

determining the N USB ports and the permissions corresponding to the N USB ports via the BIOS, creating Types that are in one-to-one correspondence with the N USB ports in the SMBIOS, and writing the permissions corresponding to the N USB ports into the Types corresponding to respective USB ports.

In view that in the related art, when the BIOS writes data into the SMBIOS, Types that are in one-to-one correspondence with respective USB ports would not be created for respective USB ports, in this embodiment, in order to write the permissions corresponding to the respective USB ports into the SMBIOS, it is necessary to determine the N USB ports first, that is, distinguishing the N USB ports, and determining the permissions corresponding to the N USB ports. In order to write the N USB ports and the permissions corresponding to the N USB ports into the SMBIOS and distinguish the same, in the present embodiment, Types that is one-to-one correspondence with the N USB ports are also created in the SMBIOS, and the permissions corresponding to the N USB ports are written into the Types corresponding to the respective USB ports, so as to read the permission corresponding to a corresponding USB port from a corresponding Tpye, and locate a specific USB port according to the Tpye of the read permission.

In some embodiments, determining the permissions corresponding to the N USB ports includes:

querying and recording the permissions corresponding to the N USB ports set by the user on a USB port interface under the BIOS.

In the related art, under the BIOS, the user usually can only view how many USB ports are included in the computer and approximate positions of these ports. However, in the present embodiment, in order to determine the permissions of the N USB ports, under the BIOS, the user can set the permissions of the N USB ports according to actual needs thereof. In this way, the permissions of the N USB ports are set by the user under the BIOS so as to subsequently write the permissions of the N USB ports into the SMBIOS, which further improves the security and prevents the permissions of the N USB ports from being maliciously modified.

After permissions corresponding to the N USB ports are set by the user, the BIOS can determine permissions corresponding to the N USB ports by querying and recording the permissions corresponding to the N USB ports set by the user on the USB port interface under the BIOS, so as to write the permissions corresponding to the USB ports into the SMBIOS. For example, after obtaining the permission corresponding to the USB port set by the user, the BIOS records the permissions of the USB ports via a variable USB_X_STATUS_Y, where X represents a USBPort ID (identity document) of a specific USB port, and Y represents the permission of the USB port set by the user. When writing the permission into the SMBIOS according to the USB_X_STATUS_Y, the Type corresponding to the USB port is first determined in the SMBIOS according to the value of X, and then the permission of the USB port is written into the Type corresponding to the USB port according to the value of Y.

In some embodiments, determining the N USB ports includes:
  acquiring device paths of the N USB ports from a peripheral component interconnect (PCI) configuration space of USB controllers that are in one-to-one correspondence with the N USB ports; and
  determining the N USB ports according to the device paths.

When the computer is powered on, the BIOS will acquire the PCI configuration space of all the PCI devices, including the PCI configuration space of USB controllers that are in one-to-one correspondence with N USB ports. Therefore, in the present embodiment, by reading the PCI configuration space of the USB controllers that are in one-to-one correspondence with with N USB ports, for example, reading information such as PCI BUS, PCI Device, PCI Function and PCI Segment in the PCI configuration space of the USB controllers that are in one-to-one correspondence with with N USB ports, device paths of the N USB ports are acquired from the information in the PCI configuration space, and the N USB ports are determined according to the device paths, which is simple to implement.

It should also be noted that when a USB port is not connected to a USB device, the device path of the USB port only records the location of the USB port on the motherboard, and when the USB port is not connected to s USB device, the device provider ID and device product ID of the USB device are also recorded in the device path of the USB port.

In some embodiments, after acquiring device paths of the N USB ports from the PCI configuration space of USB controllers that are in one-to-one correspondence with the N USB ports, the port management method further includes:
  recording the device paths into the corresponding Types.

Since the device provider ID and the device product ID of the USB device are recorded in the device path of the USB port when the USB port is connected with the USB device, in order to facilitate the subsequent locating to a specific USB device according to the device provider ID and the device product ID of the USB device and to set the permission of the USB device, the device path of the USB port is also recorded in the Type corresponding to the USB port in the present embodiment. In this way, it facilitates the subsequent locating to a specific USB device according to the device provider ID and the device product ID of the USB device and to set the permission of the USB device.

In some embodiments, writing permissions corresponding to the N USB ports into the Types corresponding to the respective USB ports includes:
  creating a preset field in the Type, and writing permissions corresponding to the N USB ports into the preset field in the Types corresponding to the respective USB ports;
  the querying the permission corresponding to the USB port inserted with the USB device in the SMBIOS includes:
    querying the permission corresponding to the USB port inserted with the USB device in the preset field of the Type corresponding to the USB port inserted with the USB device in the SMBIOS.

In order to facilitate query the permission corresponding to the USB port in the SMBIOS, in the present embodiment, the preset field is created in the each of the Types corresponding to the N USB ports, and the permissions corresponding to the N USB ports are written into the preset fields in the Types corresponding to the respective USB ports. When the permission corresponding to the USB port inserted with the USB device is queried in the SMBIOS, the Type corresponding to the USB port inserted with the USB device is determined, then the permission corresponding to the USB port can be found in the preset field in the Type corresponding to the USB port inserted with the USB device. For example, when the preset field is a SupportProperty field, the SupportProperty field is created in each of the Types corresponding to the N USB ports, and permissions corresponding to the N USB ports are written into the SupportProperty fields in the Types corresponding to the respective USB ports. When the permission corresponding to the USB port inserted with the USB device is queried in the SMBIOS, the Type corresponding to the USB port inserted with the USB device is determined, then the permission corresponding to the USB port can be found in the SupportProperty field in the Type corresponding to the USB port inserted with the USB device.

In some embodiments, the permissions corresponding to the N USB ports include:
  a combination of one or more of a first permission that allows the the USB port to only identify a keyboard and a mouse, and does not allow the USB port to identify a USB storage device; a second permission that only allows to read data in the USB device connected to the USB port, and does not allow to write data into the USB device connected to the USB port; a third permission that allows to read data in the USB device connected to the USB port and write data into the USB device connected to the USB port; and a fourth permission for disabling the USB device connected to the USB port.

In order to satisfy the user's requirement for setting the permission of the USB port, in the present embodiment, the permission of the USB port may be set to be: a first permission that allows the USB port to only identify a keyboard and a mouse, and does not allow the USB port to identify a USB storage device; or a second permission that allows to only read data in the USB device connected to the USB port, and does not allow to write data into the USB device connected to the USB port; or a third permission that allows to read data in the USB device connected to the USB port, and write data into the USB device connected to the USB port; or a fourth permission for disabling the USB device connected to the USB port.

Figure 2:
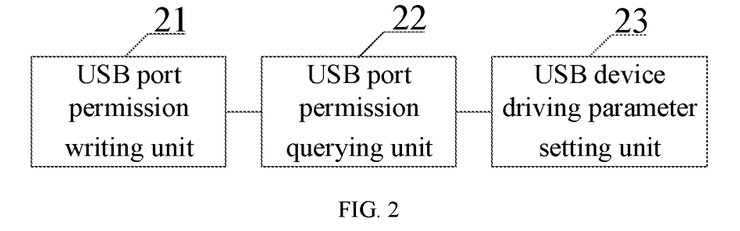
FIG. 2 is a schematic structural diagram of a port management system provided in some embodiments of the disclosure.

With reference to FIG. 2, FIG. 2 is a schematic structural diagram of a port management system provided in some embodiments of the disclosure.

Some embodiments of the disclosure further provide a port management system, including:
  a USB port permission writing unit 21 configured for writing permissions corresponding to N USB ports into SMBIOS via BIOS;
  a USB port permission querying unit 22 configured for, when a USB port is inserted with a USB device, querying the permission corresponding to the USB port inserted with the USB device from the SMBIOS; and a USB device driving parameter setting unit 23 configured for setting driving parameters of the USB device according to the permission corresponding to the USB port inserted with the USB device.

Reference is made to the above-mentioned embodiments for a relevant introduction of the port management system, which will not be repeated herein.

Figure 3:
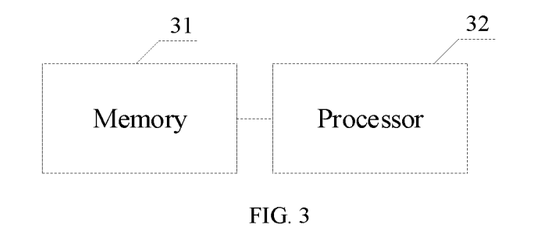
FIG. 3 is a schematic structural diagram of a port management device provided in some embodiments of the disclosure.

With reference to FIG. 3, FIG. 3 is a schematic structural diagram of a port management device provided in some embodiments of the disclosure.

Some embodiments of the disclosure further provide a port management device, including:

a memory 31 configured for storing a computer program; and a processor 32 configured for executing the computer program to implement steps of the port management method described above.

Reference is made to the above-mentioned embodiments for a relevant introduction of the port management device, which will not be repeated herein.

Figure 4:
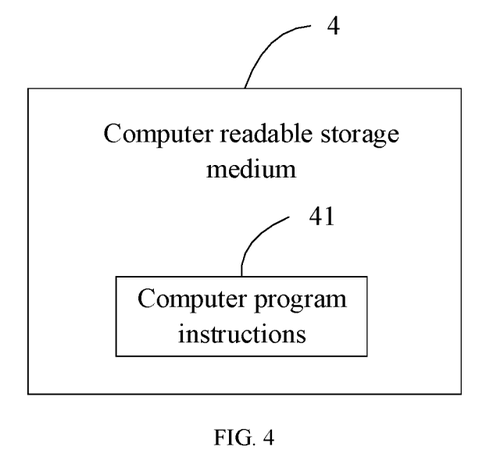
FIG. 4 is a schematic structural diagram of a non-volatile computer readable storage medium provided in some embodiments of the disclosure.

With reference to FIG. 4, FIG. 4 is a schematic structural diagram of a non-volatile computer readable storage medium provided in some embodiments of the disclosure.

Some embodiments of the disclosure further provide a non-volatile computer readable storage medium 4. The non-volatile computer readable storage medium 4 is stored with a computer program 41 that, when executed by a processor, implements steps of the port management method described above.

Reference is made to the above-mentioned embodiments for a relevant introduction of the non-volatile computer readable storage medium, which will not be repeated herein.

Various embodiments described in the description are described in a progressive manner, each embodiment focuses on the difference from other embodiments, and the same or similar parts of each embodiment can be referred to each other. The device disclosed in the embodiment corresponds to the method disclosed in the embodiment, thus the description thereof is relatively simple, and for the related information, please refer to the description of the method.

It should further be noted that relational terms such as "first" and "second" are used herein merely to distinguish an entity from another entity, and do not necessarily require or imply the existence of any such actual relationship or sequence between these entities. Furthermore, the terms "comprising", "including" or any other variation thereof are intended to cover a non-exclusive inclusion, such that a process, method, article or device including a list of elements include not only those elements but also other elements not expressly listed, or elements inherent to the process, method, article or device. Unless being further limited, an element defined by the phrase "comprising a . . . " does not exclude the presence of additional identical elements in the process, method, article or device including said element.

The present application may be implemented or used by those skilled in the art according to the embodiments provided in the disclosure. Various modifications to these embodiments will be readily apparent to those skilled in the art, and the generic principles defined herein may be practiced in other embodiments without departing from the spirit or scope of the present disclosure. Therefore, the present application is not to be limited to the embodiments herein, but is to be accorded the widest scope consistent with the principles and novel features disclosed herein.

The invention claimed is:

1. A port management method, applied to a computer comprising N universal serial bus (USB) ports, N being an integer not less than 2, wherein the port management method comprises:

writing, via a basic input output system (BIOS), permissions corresponding to the N USB ports into a system management basic input output system (SMBIOS);

in response to a USB port being inserted with a USB device, querying, in the SMBIOS, the permission corresponding to the USB port inserted with the USB device under an operating system (OS); and setting, according to the permission corresponding to the USB port inserted with the USB device, driving parameters of the USB device under the OS;

wherein the writing, via a basic input output system (BIOS), permissions corresponding to the N USB ports into a system management basic input output system (SMBIOS) comprises:

determining, via the BIOS, the N USB ports and the permissions corresponding to the N USB ports, creating Types that are in one-to-one correspondence with the N USB ports in the SMBIOS, and writing the permissions corresponding to the N USB ports into the Types corresponding to respective USB ports;

wherein the determining the permissions corresponding to the N USB ports comprises:

querying and recording the permissions corresponding to the N USB ports set by a user on a USB port interface under BIOS;

wherein the recording the permissions corresponding to the N USB ports set by the user on the USB port interface under BIOS comprises:

recording the permissions of respective USB ports via a variable USB X STATUS Y;

wherein a value of X in the variable USB X STATUS Y represents an universal serial bus port identify label USBPort ID of a USB port, and a value of Y in the variable USB X STATUS Y corresponds to the permission of the USB port set by the user.

2. The port management method according to claim 1, wherein the writing the permissions corresponding to the N USB ports into the Types corresponding to respective USB ports comprises:

determining a Type corresponding to the USB port in the SMBIOS according to the X value of the USB port, and writing the permission of the USB port into the Type corresponding to the USB port according to the Y value of the USB port.

3. The port management method according to claim 1, wherein the determining the N USB ports comprises:

acquiring device paths of the N USB ports from a peripheral component interconnect (PCI) configuration space of USB controllers that are in one-to-one correspondence with the N USB ports; and determining the N USB ports according to the device paths.

4. The port management method according to claim 3, wherein the acquiring device paths of the N USB ports from the PCI configuration space of USB controllers that are in one-to-one correspondence with the N USB ports comprises:

reading a PCI BUS, a PCI device, a PCI function and a PCI segment in the PCI configuration space of the USB controllers that are in one-to-one correspondence with the N USB ports; and obtaining the device paths of the N USB ports from the read PCI BUS, PCI device, PCI function and PCI segment.

5. The port management method according to claim 3, wherein after acquiring device paths of the N USB ports from the PCI configuration space of USB controllers that are in one-to-one correspondence with the N USB ports, the port management method further comprises:

recording the device paths into the corresponding Types.

6. The port management method according to claim 1, wherein the writing the permissions corresponding to the N USB ports into the Types corresponding to respective USB ports comprises:

creating a preset field in the Type, and writing permissions corresponding to the N USB ports into the preset fields in the Types corresponding to the respective USB ports; and the querying, in the SMBIOS, the permission corresponding to the USB port inserted with the USB device under an operating system (OS) comprises:

querying, in the preset field of the Type corresponding to the USB port inserted with the USB device in the SMBIOS, the permission corresponding to the USB port inserted with the USB device.

7. The port management method according to claim 6, wherein the querying, in the preset field of the Type corresponding to the USB port inserted with the USB device in the SMBIOS, the permission corresponding to the USB port inserted with the USB device comprises:

determining the Type corresponding to the USB port inserted with the USB device; and querying, in the preset field in the corresponding Type, the permission corresponding to the USB port inserted with the USB device.

8. The port management method according to claim 7, wherein the preset field is a SupportProperty field, and the writing the permissions corresponding to the N USB ports into the Types corresponding to respective USB ports comprises:

creating SupportProperty fields in the Types corresponding to the N USB ports; and writing permissions corresponding to the N USB ports into the SupportProperty fields in the Types corresponding to the respective USB ports.

9. The port management method according to claim 8, wherein the querying, in the preset field in the corresponding Type, the permission corresponding to the USB port inserted with the USB device comprises:

querying, in the SupportProperty field in the Type corresponding to the USB port inserted with the USB device, the permission corresponding to the USB port inserted with the USB device.

10. The port management method according to claim 1, wherein the writing, via a basic input output system (BIOS), permissions corresponding to the N USB ports into a system management basic input output system (SMBIOS) comprises:

writing, via the BIOS, the permissions corresponding to the N USB ports into the SMBIOS when the computer is powered on.

11. The port management method according to claim 1, further comprising:

in response to the USB device being inserted, recording a device provider identity document (ID) and a device product identity document (ID) of the inserted USB device.

12. The port management method according to claim 1, wherein the permissions corresponding to the N USB ports comprises:

a combination of one or more of: a first permission that only allows the USB port to identify a keyboard and a mouse, and does not allow the USB port to identify a USB storage device; a second permission that only allows to read data in the USB device connected to the USB port, and does not allow to write data into the USB device connected to the USB port; a third permission that allows to read data in the USB device connected to the USB port and write data into the USB device connected to the USB port; and a fourth permission for disabling the USB device connected to the USB port.

13. A port management device, comprising:

a memory configured for storing a computer program; and a processor configured for executing the computer program to implement operations of:

writing, via a basic input output system (BIOS), permissions corresponding to the N USB ports into a system management basic input output system (SMBIOS);

in response to a USB port being inserted with a USB device, querying, in the SMBIOS, the permission corresponding to the USB port inserted with the USB device under an operating system (OS); and setting, according to the permission corresponding to the USB port inserted with the USB device, driving parameters of the USB device under the OS;

wherein the processor is further configured for determining, via the BIOS, the N USB ports and the permissions corresponding to the N USB ports, creating Types that are in one-to-one correspondence with the N USB ports in the SMBIOS, and writing the permissions corresponding to the N USB ports into the Types corresponding to respective USB ports;

wherein the processor is further configured for:

querying and recording the permissions corresponding to the N USB ports set by the user on a USB port interface under BIOS;

wherein the processor is further configured for:

recording the permissions of respective USB ports via a variable USB X STATUS Y;

wherein a value of X in the variable USB X STATUS Y represents an universal serial bus port identify label USBPort ID of a USB port, and a value of Y in the variable USB X STATUS Y corresponds to the permission of the USB port set by the user.

14. A non-transitory computer readable storage medium, wherein the non-volatile computer readable storage medium is stored with a computer program that, when executed by a processor, implements operations of:

writing, via a basic input output system (BIOS), permissions corresponding to the N USB ports into a system management basic input output system (SMBIOS);

in response to a USB port being inserted with a USB device, querying, in the SMBIOS, the permission corresponding to the USB port inserted with the USB device under an operating system (OS); and setting, according to the permission corresponding to the USB port inserted with the USB device, driving parameters of the USB device under the OS;

wherein the writing, via a basic input output system (BIOS), permissions corresponding to the N USB ports into a system management basic input output system (SMBIOS) comprises:

determining, via the BIOS, the N USB ports and the permissions corresponding to the N USB ports, creating Types that are in one-to-one correspondence with the N USB ports in the SMBIOS, and writing the permissions corresponding to the N USB ports into the Types corresponding to respective USB ports;

wherein the determining the permissions corresponding to the N USB ports comprises:

querying and recording the permissions corresponding to the N USB ports set by a user on a USB port interface under BIOS;

wherein the recording the permissions corresponding to the N USB ports set by the user on the USB port interface under BIOS comprises:

recording the permissions of respective USB ports via a variable USB X STATUS Y;

wherein a value of X in the variable USB X STATUS Y represents an universal serial bus port identify label USBPort ID of a USB port, and a value of Y in the variable USB X STATUS Y corresponds to the permission of the USB port set by the user.

\* \* \* \* \*